(12) United States Patent
Nunokawa et al.

(10) Patent No.: US 8,304,127 B2
(45) Date of Patent: Nov. 6, 2012

(54) FUEL CELL STACK

(75) Inventors: Kazuo Nunokawa, Utsunomiya (JP); So Fujiwara, Yaita (JP); Seiji Sugiura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 347 days.

(21) Appl. No.: 12/707,296

(22) Filed: Feb. 17, 2010

(65) Prior Publication Data

US 2010/0209798 A1 Aug. 19, 2010

(30) Foreign Application Priority Data

Feb. 19, 2009 (JP) ................................. 2009-036415

(51) Int. Cl.
*H01M 8/00* (2006.01)
(52) U.S. Cl. ....................................... 429/455; 429/444
(58) Field of Classification Search .................. 429/444, 429/455; 4/492; 29/428; 52/169.5
See application file for complete search history.

(56) References Cited

U.S. PATENT DOCUMENTS

| 7,157,164 | B2 * | 1/2007 | Nakanishi et al. ............ 429/444 |
| 7,842,426 | B2 | 11/2010 | Tighe et al. |
| 7,862,936 | B2 | 1/2011 | Owejan et al. |
| 2009/0004547 | A1 * | 1/2009 | Vitella et al. .................... 429/39 |

FOREIGN PATENT DOCUMENTS

| JP | 5-94831 | 4/1993 |
| JP | 2004-146303 | 5/2004 |
| JP | 2004-207074 | 7/2004 |
| JP | 2006-100016 | 4/2006 |
| JP | 2006-147503 | 6/2006 |
| JP | 2008-16272 | 1/2008 |
| JP | 2008-153212 | 7/2008 |
| JP | 2008-171822 | 7/2008 |

OTHER PUBLICATIONS

Japanese Office Action for Application No. 2009-036415, dated Jun. 21, 2011.
Japanese Office Action for Application No. 2009-036415, 4 pages, dated Apr. 24, 2012.

* cited by examiner

*Primary Examiner* — Jennifer Michener
*Assistant Examiner* — Monique Wills
(74) *Attorney, Agent, or Firm* — Nelson Mullins Riley & Scarborough LLP; Anthony A. Laurentano

(57) ABSTRACT

A fuel cell stack includes a plurality of power generation cells stacked in a direction of gravity. In a cathode side separator of the power generation cell, an oxygen-containing gas discharge passage is connected to an oxygen-containing gas flow field, and a water guide member is provided for the oxygen-containing gas discharge passage for allowing condensed water to be directly dropped in the direction of gravity along the oxygen-containing gas discharge passage. The water guide member is a plate member protruding into the oxygen-containing gas discharge passage and inclined toward the direction of gravity.

9 Claims, 11 Drawing Sheets

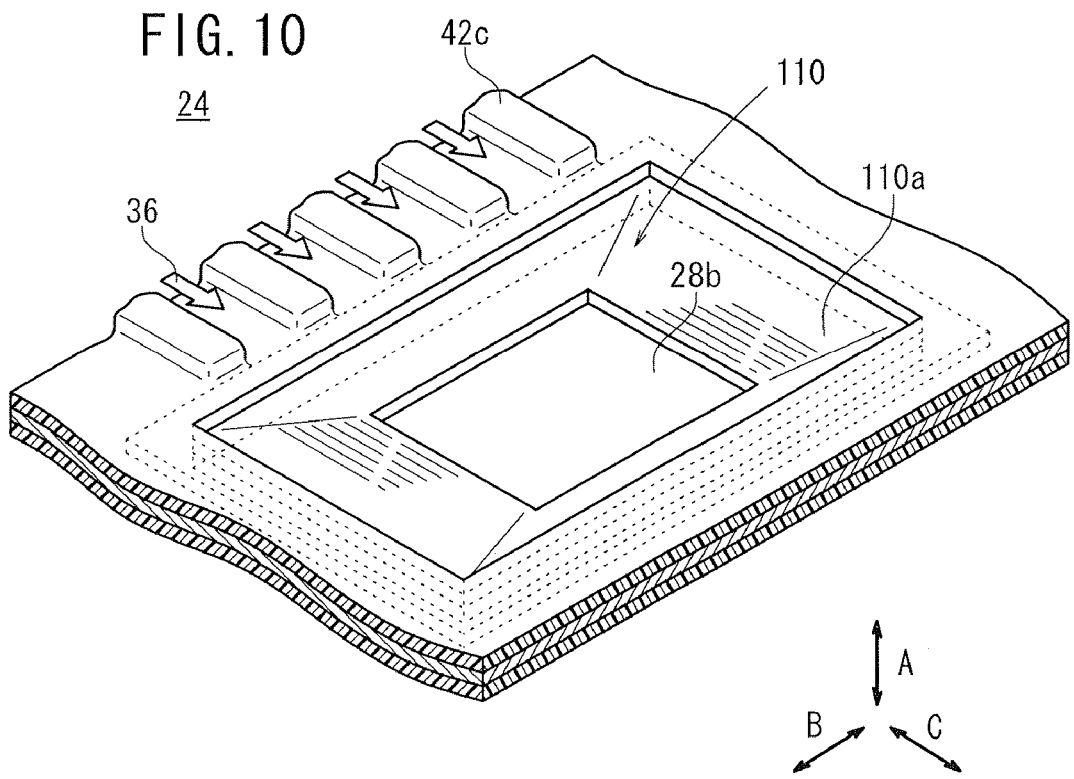

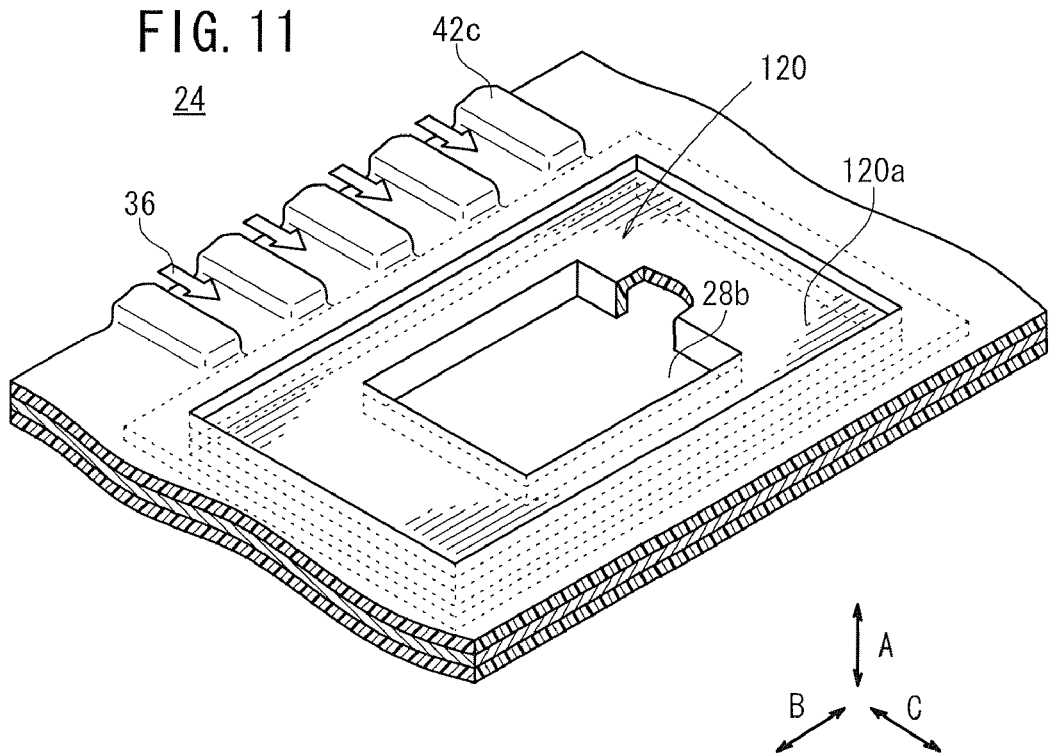

FUEL CELL STACK

CROSS-REFERENCE TO RELATED APPLICATION

This application is based upon and claims the benefit of priority from Patent Application No. 2009-036415 filed on Feb. 19, 2009, in the Japan Patent Office, of which the contents are incorporated herein by reference.

BACKGROUND OF THE INVENTION

1. Field of the Invention

The present invention relates to a fuel cell stack formed by stacking a plurality of power generation cells in a direction of gravity. Each of the power generation cells includes an electrolyte electrode assembly and a separator stacked together. The electrolyte electrode assembly includes a pair of electrodes and an electrolyte interposed between the electrodes. A reactant gas flow field is formed for allowing a reactant gas to flow along a surface of the separator. Reactant gas passages are formed for allowing the reactant gas to flow in the stacking direction.

2. Description of the Related Art

For example, a solid polymer electrolyte fuel cell employs a membrane electrode assembly (electrolyte electrode assembly) (MEA) which includes an anode, a cathode, and an electrolyte membrane (electrolyte) interposed between the anode and the cathode. The electrolyte membrane is a solid polymer ion exchange membrane. The membrane electrode assembly is sandwiched between separators to form a power generation cell.

In automobile use, normally, in order to achieve a desired power generation output for automobile application, a predetermined number of (e.g., several tens to hundreds of) power generation cells are stacked together to form a fuel cell stack. In general, the fuel cell stack adopts so called internal manifold structure in which reactant gas flow fields for allowing reactant gases to flow along power generation surfaces in the separators, and reactant gas passages connected to the reactant gas flow fields and extending through the power generation cells in the stacking direction are provided.

In the fuel cell stack having the internal manifold structure, the water produced in the power generation reaction may be retained in the manifolds (reactant gas passages), in particular, on the outlet side. In this regard, for avoiding unstable operation due to flooding, for example, a fuel cell disclosed in Japanese Laid-Open Patent Publication No. 2004-146303 is known.

The fuel cell has a fuel cell stack formed by stacking unit cells, and each of the unit cells includes an ion-conductive electrolyte membrane, an anode and a cathode provided on both surfaces of the ion conductive electrolyte membrane, and a pair of electrically-conductive separator plates having a fuel gas flow field for supplying/discharging a fuel gas to/from the anode and an oxygen-containing gas flow field for supplying/discharging the oxygen-containing gas to/from the cathode.

Further, the cell stack includes a fuel gas inlet manifold for supplying the fuel gas to the fuel gas flow field, an oxygen-containing gas inlet manifold for supplying the oxygen-containing gas to the oxygen-containing gas flow field, a fuel gas outlet manifold for discharging the fuel gas from the fuel gas flow field, an oxygen-containing gas outlet manifold for discharging the oxygen-containing gas from the oxygen-containing gas flow field, a fuel gas inlet connected to the fuel gas inlet manifold, an oxygen-containing gas inlet connected to the oxygen-containing gas inlet manifold, a fuel gas outlet connected to the fuel gas outlet manifold, and an oxygen-containing gas outlet connected to the oxygen-containing gas outlet manifold.

Each of the manifolds extends through the electrically conductive separator plates in the stacking direction. At least one of the manifolds is downwardly-inclined in the gas movement direction. The inclination angle of the direction in which the manifold passes through the separator plate relative to the horizontal direction is not less than the angle at which droplets start to slide on the inner surface of the manifold, and not higher than 45°.

In Japanese Laid-Open Patent Publication No. 2004-146303, for example, when the oxygen-containing gas partially consumed in the power generation reaction and the water produced in the power generation reaction are discharged into the oxygen-containing gas outlet manifold of the electrically conductive separator plate, the water may flow around the end surface of the oxygen-containing gas outlet manifold, and the water may contact with another electrically-conductive separator plate. As a result, liquid junction (short circuit due to liquid) occurs between the unit cells (power generation cells). Then, corrosion occurs in the electrically conductive separator plates, and also the electrically conductive separator plates become thin.

SUMMARY OF THE INVENTION

The present invention has been made taking the problems of this type, and an object of the present invention is to provide a fuel cell stack in which condensed water in a reactant gas flow field can be dropped directly along a reactant gas passage in a direction of gravity reliably, and it becomes possible to prevent liquid junction among power generation cells as much as possible.

The present invention relates to a fuel cell stack formed by stacking a plurality of power generation cells in a direction of gravity. Each of the power generation cells includes an electrolyte electrode assembly and a separator stacked together. The electrolyte electrode assembly includes a pair of electrodes and an electrolyte interposed between the electrodes. A reactant gas flow field is formed for allowing a reactant gas to flow along a surface of the separator. A reactant gas supply passage and a reactant gas discharge passage are formed for allowing the reactant gas to flow in a stacking direction.

A water guide member is provided for at least the reactant gas discharge passage for allowing condensed water to be dropped directly in the direction of gravity along the reactant gas discharge passage.

According to the present invention, when the reactant gas and the condensed water are discharged into the reactant gas discharge passage, the condensed water is guided by the water guide member. Therefore, the water can be dropped directly in the direction of gravity along the reactant gas discharge passage. Thus, it is possible to prevent occurrence of liquid junction among the power generation cells due to the water produced in the power generation reaction as much as possible.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a perspective view showing a water guide member of a fuel cell stack according to a sixth embodiment of the present invention; and FIG. 11 is a perspective view showing a water guide member of a fuel cell stack according to a seventh embodiment of the present invention.

DESCRIPTION OF THE PREFERRED EMBODIMENTS

Figure 1:
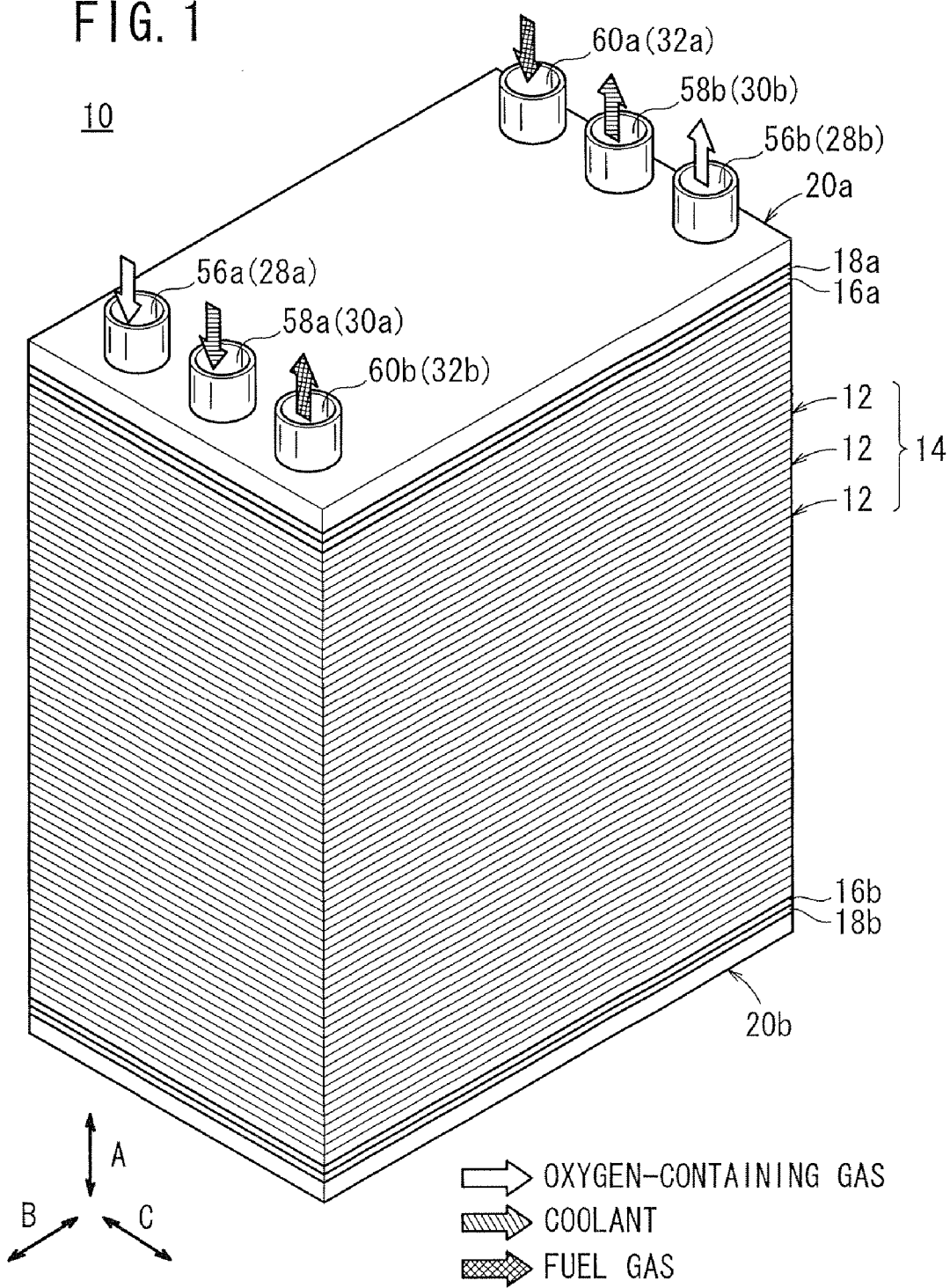
FIG. 1 is a perspective view schematically showing a fuel cell stack according to a first embodiment of the present invention.
Figure 2:
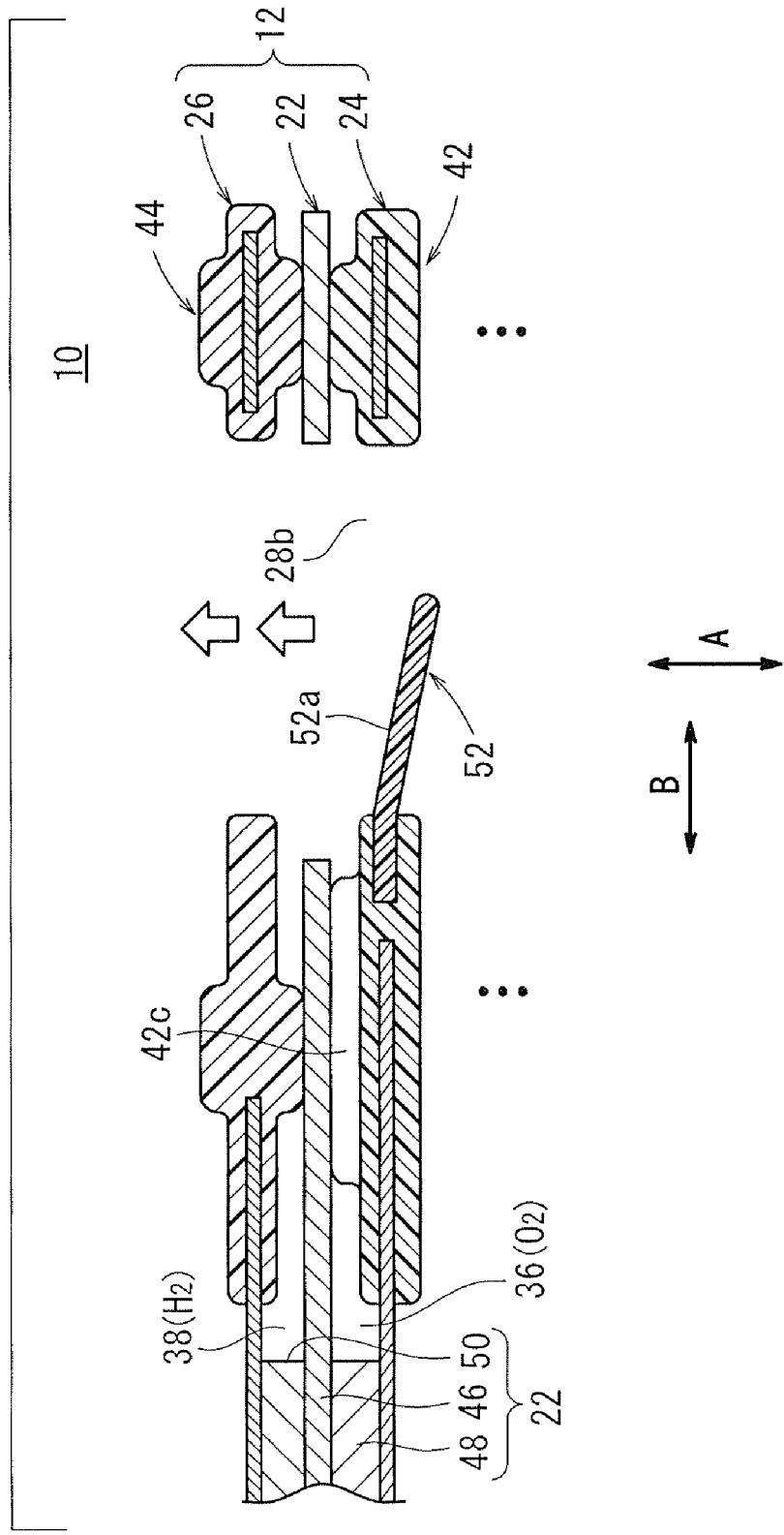
FIG. 2 is a partial cross sectional view showing the fuel cell stack.

As shown in FIGS. 1 and 2, a fuel cell stack 10 according to a first embodiment of the present invention includes a stack body 14 formed by stacking a plurality of power generation cells 12 in a direction of gravity indicated by an arrow A. At one end (upper end) of the stack body 14 in a stacking direction indicated by the arrow A, a terminal plate 16a is provided. An insulating plate 18a is provided on the terminal plate 16a, and an end plate 20a is provided on the insulating plate 18a. At the other end (lower end) of the stack body 14 in the stacking direction, a terminal plate 16b is provided. An insulating plate 18b is provided on the terminal plate 16b, and an end plate 20b is provided on the insulating plate 18b. A tightening load is applied to the end plates 20a, 20b by tie-rods (not shown) in the stacking direction, whereby the load is applied to components between the end plates 20a, 20b. Alternatively, a box-shaped casing containing the fuel cell stack 10 may be employed.

Figure 3:
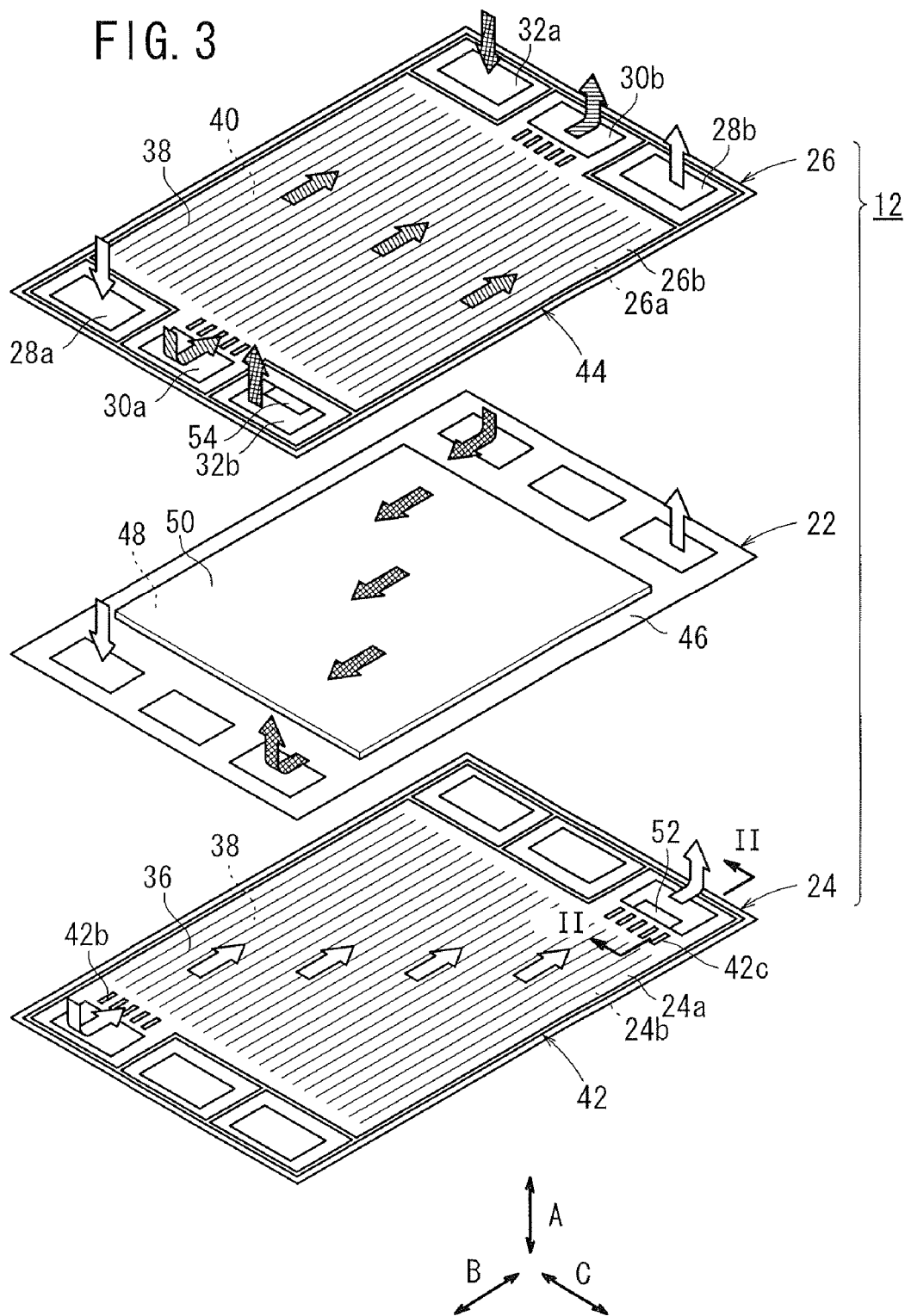
FIG. 3 is an exploded perspective view showing a power generation cell of the fuel cell stack.

As shown in FIG. 3, each of the power generation cells 12 has a membrane electrode assembly (electrolyte electrode assembly) 22, and a cathode side separator 24 and an anode side separator 26 sandwiching the membrane electrode assembly 22. The cathode side separator 24 and the anode side separator 26 are metal separators. Alternatively, carbon separators may be used as the cathode side separator 24 and the anode side separator 26.

At one end of the power generation cell 12 in a direction (horizontal direction) indicated by an arrow B, an oxygen-containing gas supply passage (reactant gas supply passage) 28a for supplying an oxygen-containing gas, a coolant supply passage 30a for supplying a coolant, and a fuel gas discharge passage (reactant gas discharge passage) 32b for discharging a fuel gas such as a hydrogen-containing gas are provided. The oxygen-containing gas supply passage 28a, the coolant supply passage 30a, and the fuel gas discharge passage (reactant gas discharge passage) 32b extend through the power generation cell 12 in the direction indicated by the arrow A.

At the other end of the power generation cell 12 in the direction indicated by the arrow B, a fuel gas supply passage (reactant gas supply passage) 32a for supplying the fuel gas, a coolant discharge passage 30b for discharging the coolant, and an oxygen-containing gas discharge passage (reactant gas discharge passage) 28b for discharging the oxygen-containing gas are provided. The fuel gas supply passage 32a, the coolant discharge passage 30b, and the oxygen-containing gas discharge passage 28b extend through the power generation cell 12 in the direction indicated by the arrow A.

Figure 4:
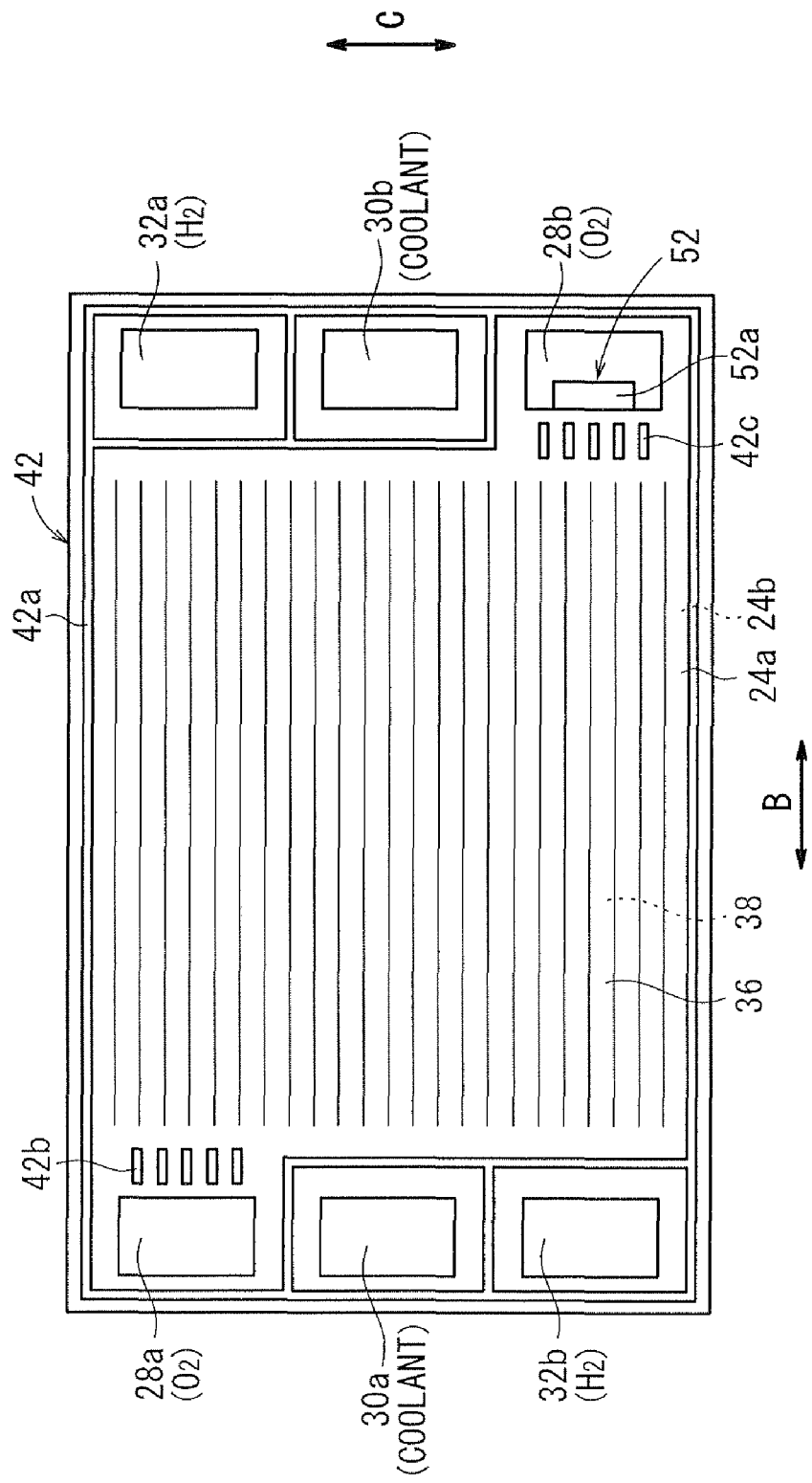
FIG. 4 is a front view showing a cathode side separator of the fuel cell stack.

As shown in FIGS. 3 and 4, for example, an oxygen-containing gas flow field (reactant gas flow field) 36 extending in the direction indicated by the arrow B is provided on a surface 24a of the cathode side separator 24 facing the membrane electrode assembly 22. The oxygen-containing gas flow field 36 is connected to the oxygen-containing gas supply passage 28a and the oxygen-containing gas discharge passage 28b. A coolant flow field 38 is formed on a surface 24b of the cathode side separator 24, opposite to the surface 24a of the cathode side separator 24. The coolant flow field 38 is connected to the coolant supply passage 30a and the coolant discharge passage 30b.

Figure 5:
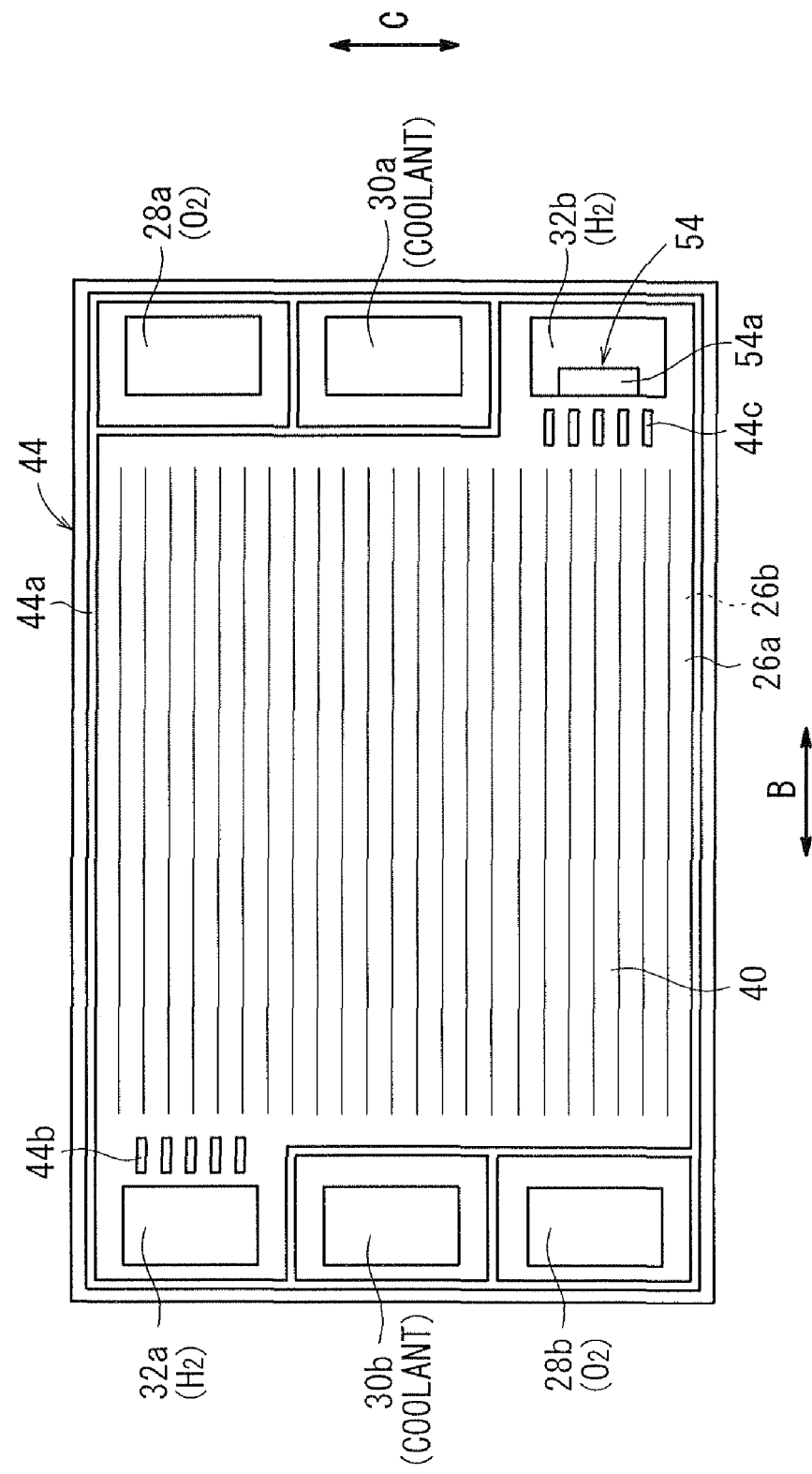
FIG. 5 is a front view showing an anode side separator of the fuel cell stack.

As shown in FIG. 5, a fuel gas flow field (reactant gas flow field) 40 extending in the direction indicated by the arrow B is formed on a surface 26a of the anode side separator 26 facing the membrane electrode assembly 22. The fuel gas flow field 40 is connected to the fuel gas supply passage 32a and the fuel gas discharge passage 32b. The coolant flow field 38 connected to the coolant supply passage 30a and the coolant discharge passage 30b is formed on a surface 26b of the anode side separator 26, opposite to the surface 26a, by overlapping the surface 26b of the anode side separator 26 on the surface 24b of the cathode side separator 24.

The cathode side separator 24 is fabricated by forming a first seal member 42 integrally on a metal thin plate by injection molding, and the anode side separator 26 is fabricated by forming a second seal member 44 integrally on a metal thin plate by injection molding.

As shown in FIG. 4, the first seal member 42 has a protrusion 42a on the surface 24a of the cathode side separator 24 to form the oxygen-containing gas flow field 36 connected to the oxygen-containing gas supply passage 28a and the oxygen-containing gas discharge passage 28b. The first seal member 42 includes a plurality of protrusions 42b and protrusions 42c to form bridges at positions adjacent to the oxygen-containing gas supply passage 28a and the oxygen-containing gas discharge passage 28b, respectively. The protrusions 42b and the protrusions 42c, and the protrusion 42a are formed integrally with the first seal member 42.

As shown in FIG. 5, the second seal member 44 has a protrusion 44a on the surface 26a of the anode side separator 26 to form the fuel gas flow field 40 connected to the fuel gas supply passage 32a and the fuel gas discharge passage 32b. The second seal member 44 includes a plurality of protrusions 44b and protrusions 44c to form bridges at positions adjacent to the fuel gas supply passage 32a and the fuel gas discharge passage 32b. The protrusions 44b and the protrusions 44c, and the protrusion 44a are formed integrally with the second seal member 44.

As shown in FIGS. 2 and 3, the membrane electrode assembly 22 includes a cathode 48, an anode 50, and a solid polymer electrolyte membrane (electrolyte) 46 interposed between the cathode 48 and the anode 50. The solid polymer electrolyte membrane 46 is formed by impregnating a thin membrane of perfluorosulfonic acid with water, for example.

Each of the cathode 48 and the anode 50 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the cathode 48 and the electrode catalyst layer of the anode 50 are fixed to both surfaces of the solid polymer electrolyte membrane 46, respectively.

As shown in FIGS. 2 and 4, a water guide member 52 having a guide surface 52a is provided for the cathode side separator 24 and projects into the oxygen-containing gas discharge passage 28b, for guiding water (condensed water) which is produced in the power generation reaction and which is contained in the partially-consumed oxygen-containing gas discharged from the oxygen-containing gas flow field 36, so that the water can be dropped directly in the direction of gravity along the oxygen-containing gas discharge passage 28b.

The water guide member 52 is a plate member protruding into the oxygen-containing gas discharge passage 28b, and inclined toward the direction of gravity (see FIG. 2). The water guide member 52 is a member made of resin material. For example, water repellent treatment may be performed by applying fluorine-containing solution to the surface of the resin member. One end of the water guide member 52 is embedded in the first seal member 42, and the water guide member 52 is combined with the first seal member 42 into one piece.

Likewise, a water guide member 54 protruding into the fuel gas discharge passage 32b is provided for the anode side separator 26. The water guide member 54 is a plate member protruding into the fuel gas discharge passage 32b, and inclined toward the direction of gravity. One end of the water guide member 54 is embedded in the second seal member 44. The water guide member 54 is a member made of resin material, and has a guide surface 54a protruding into the fuel gas discharge passage 32b.

As shown in FIG. 1, at one end of the end plate 20a in the direction indicated by the arrow B, an oxygen-containing gas inlet port 56a connected to the oxygen-containing gas supply passage 28a, a coolant inlet port 58a connected to the coolant supply passage 30a, and a fuel gas outlet port 60b connected to the fuel gas discharge passage 32b are provided.

At the other end of the end plate 20a in the direction indicated by the arrow B, a fuel gas inlet port 60a connected to the fuel gas supply passage 32a, a coolant outlet port 58b connected to the coolant discharge passage 30b, and an oxygen-containing gas outlet port 56b connected to the oxygen-containing gas discharge passage 28b are provided.

Operation of the fuel cell stack 10 will be described below.

Firstly, as shown in FIG. 1, at the end plate 20a, an oxygen-containing gas is supplied from the oxygen-containing gas inlet port 56a to the oxygen-containing gas supply passage 28a, and a fuel gas such as a hydrogen-containing gas is supplied from the fuel gas inlet port 60a to the fuel gas supply passage 32a. Further, a coolant such as pure water, ethylene glycol, oil or the like is supplied from the coolant inlet port 58a to the coolant supply passage 30a.

Thus, as shown in FIG. 3, the oxygen-containing gas flows from the oxygen-containing gas supply passage 28a to the oxygen-containing gas flow field 36 of the cathode side separator 24. In the structure, the oxygen-containing gas flows through the oxygen-containing gas flow field 36 in the direction indicated by the arrow B, and is supplied to the cathode 48 of the membrane electrode assembly 22 for inducing an electrochemical reaction at the cathode 48.

The fuel gas flows into the fuel gas flow field 40 formed in the anode side separator 26. The fuel gas supplied into the fuel gas flow field 40 moves in the direction indicated by the arrow B, and is supplied to the anode 50 of the membrane electrode assembly 22 for inducing an electrochemical reaction at the anode 50.

Thus, in the membrane electrode assembly 22, the oxygen-containing gas supplied to the cathode 48, and the fuel gas supplied to the anode 50 are partially consumed in the electrochemical reactions at the electrode catalyst layers of the cathode 48 and the anode 50 for generating electricity.

The oxygen-containing gas partially consumed at the cathode 48 is discharged into the oxygen-containing gas discharge passage 28b, and then, discharged to the outside of the fuel cell stack 10 through the oxygen-containing gas outlet port 56b (see FIG. 1).

The fuel gas partially consumed at the anode 50 is discharged into the oxygen-containing gas discharge passage 28b, and then, discharged to the outside of the fuel cell stack 10 through the fuel gas outlet port 60b (see FIG. 1).

Further, as shown in FIG. 3, after the coolant is supplied from the coolant supply passage 30a to the coolant flow field 38, the coolant flows in the direction indicated by the arrow B. After the coolant cools the membrane electrode assembly 22, the coolant is discharged into the coolant discharge passage 30b. Then, as shown in FIG. 1, the coolant is discharged to the outside of the fuel cell stack 10 through the coolant outlet port 58b.

In the first embodiment, as shown in FIGS. 2 to 4, the cathode side separator 24 has the plate-like water guide member 52 protruding into the oxygen-containing gas discharge passage 28b.

In the oxygen-containing gas flow field 36, the oxygen-containing gas from the oxygen-containing gas supply passage 28a is partially consumed in the power generation reaction, and water is produced in the power generation reaction. The water is discharged into the oxygen-containing gas discharge passage 28b together with the partially-consumed oxygen-containing gas.

Since the water guide member 52 protruding into the oxygen-containing gas discharge passage 28b is provided, the water produced in the power generation reaction (condensed water) moves along the guide surface 52a of the water guide member 52, and can be directly dropped into the oxygen-containing gas discharge passage 28b. Therefore the water does not flow around the inner surface of the oxygen-containing gas discharge passage 28b to contact with the power generation cells 12 provided at lower positions.

In the structure, liquid junction (short circuit due to liquid) among the power generation cells 12 is prevented as much as possible. In particular, since corruption of the metal cathode side separator 24 and the metal anode side separator 26 is suppressed suitably, no through holes are formed in the cathode side separator 24 or the anode side separator 26, and also the cathode side separator 24 and the anode side separator 26 do not become thin. Accordingly, the power generation cells 12 can be used efficiently for power generation for a long time.

Likewise, the anode side separator 26 has the water guide member 54 protruding into the fuel gas discharge passage 32b. In the structure, the water produced in the fuel gas flow field 40 can move along the fuel gas discharge passage 32b, and can be directly dropped in the direction of gravity. The same advantages as in the case of the water guide member 52 are obtained.

Figure 6:
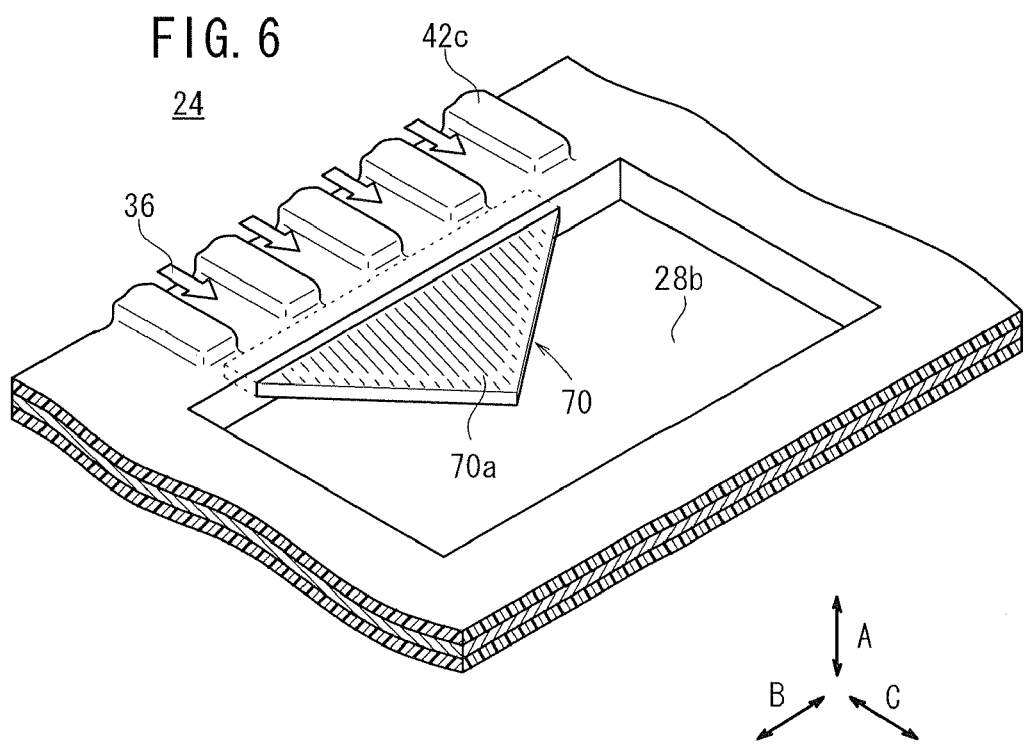
FIG. 6 is a perspective view showing a water guide member of a fuel cell stack according to a second embodiment of the present invention.

FIG. 6 is a perspective view showing a water guide member 70 of a fuel cell stack according to a second embodiment of the present invention. The constituent elements that are identical to those of the fuel cell stack 10 according to the first embodiment are labeled with the same reference numerals, and description thereof will be omitted. Also, in a third embodiment or later, description thereof will be omitted.

The water guide member 70 is a plate member having a triangular shape. The water guide member 70 has a triangular guide surface 70a protruding into the oxygen-containing gas discharge passage 28b and inclined toward the direction of gravity.

In the second embodiment, the produced water discharged from the oxygen-containing gas flow field 36 is guided along the triangular guide surface 70a having the above-mentioned inclination. In the structure, the water can be dropped directly from the front end portion of the triangular guide surface 70a into the oxygen-containing gas discharge passage 28b in the direction of gravity.

Figure 7:
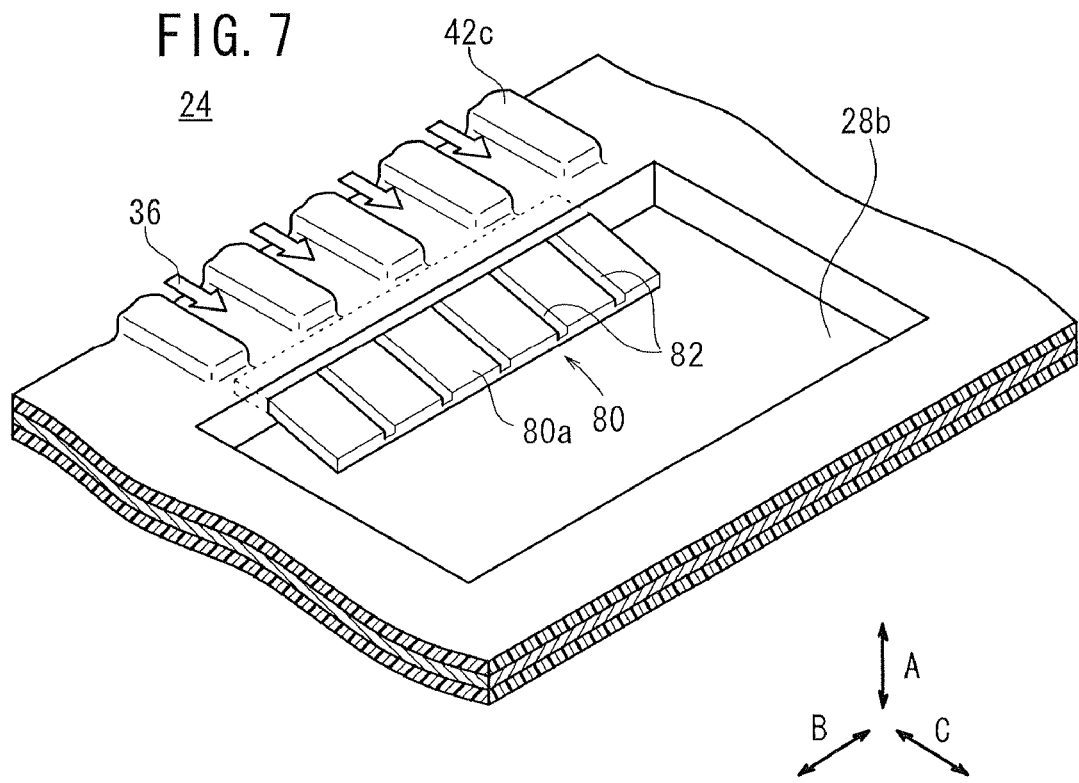
FIG. 7 is a perspective view showing a water guide member of a fuel cell stack according to a third embodiment of the present invention.

FIG. 7 is a perspective view showing a water guide member 80 of a fuel cell stack according to the third embodiment of the present invention.

As in the case of the water guide member 52, the water guide member 80 is a plate member having a rectangular shape, and has a guide surface 80a protruding into the oxygen-containing gas discharge passage 28b. A plurality of flow grooves 82 are formed in the guide surface 80a of the water guide member 80.

In the third embodiment, the produced water discharged from the oxygen-containing gas flow field 36 to the oxygen-containing gas discharge passage 28b flows smoothly and reliably along the flow grooves 82 formed in the guide surface 80a of the water guide member 80, and the water can be dropped directly into the oxygen-containing gas discharge passage 28b.

In the first to third embodiments, the water guide members 52, 54, 70, and 80 are made of resin material. However, the present invention is not limited in this respect. For example, the water guide members 52, 54, 70, and 80 may be formed integrally with the first seal member 42. Water repellant treatment may be applied to the surface of the thus-formed water guide member.

Figure 8:
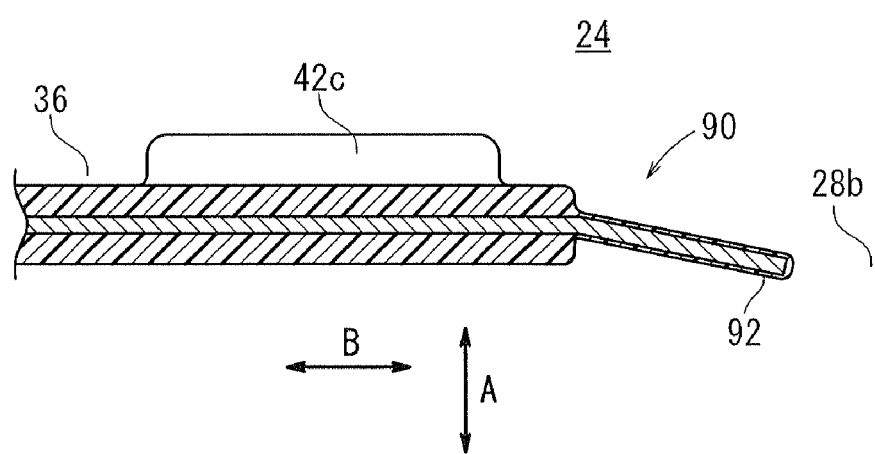
FIG. 8 is a cross sectional view showing a water guide member of a fuel cell stack according to a fourth embodiment of the present invention.

FIG. 8 is a cross sectional view showing a water guide member 90 of a fuel cell stack according to a fourth embodiment of the present invention.

The water guide member 90 is formed integrally with the cathode side separator 24. Insulating coating 92 is applied to the water guide member 90. The water guide member 90 may have the same shape as the water guide member 70 in the second embodiment or the water guide member 80 in the third embodiment.

In the fourth embodiment, the same advantages as in the cases of the first to third embodiments are obtained. Further, the number of components is reduced advantageously.

Figure 9:
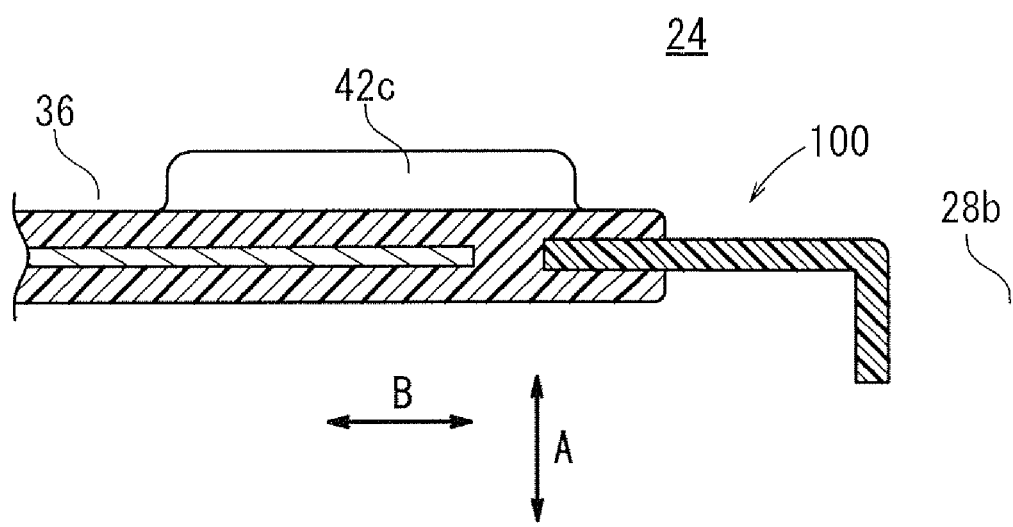
FIG. 9 is a cross sectional view showing a water guide member of a fuel cell stack according to a fifth embodiment of the present invention.

FIG. 9 is a cross sectional view showing a water guide member 100 of a fuel cell stack according to a fifth embodiment.

The water guide member 100 is a L-shaped plate member protruding into the oxygen-containing gas discharge passage 28b, and bent toward the direction of gravity.

In the fifth embodiment, after the water produced in the power generation reaction is discharged from the oxygen-containing gas flow field 36 into the oxygen-containing gas discharge passage 28b along the horizontal surface of the water guide member 100, the water is dropped in the direction of gravity from the bent portion bent toward the direction of gravity. Therefore, the water is reliably dropped into the oxygen-containing gas discharge passage 28b. The front portion of the water guide member 100 may have the same shape as the water guide member 70 in the second embodiment or the water guide member 80 in the third embodiment.

FIG. 10 is a perspective view showing a water guide member 110 of a fuel cell stack according to a sixth embodiment of the present invention.

The water guide member 110 has a rectangular ring shape formed around the oxygen-containing gas discharge passage 28b. The water guide member 110 has a substantially conical guide surface 110a inclined toward the direction of gravity, into the oxygen-containing gas discharge passage 28b. The guide surface 110a of the water guide member 110 is inclined in the same manner as the water guide member 52 in the first embodiment.

In the structure, the water produced in the power generation reaction, and discharged toward the oxygen-containing gas discharge passage 28b is guided along the guide surface 110a of the water guide member 110 having the rectangular ring shape, and the water can be dropped directly in the direction of gravity into the oxygen-containing gas discharge passage 28b.

FIG. 11 is a perspective view showing a water guide member 120 of a fuel cell stack according to a seventh embodiment of the present invention.

The water guide member 120 has a guide surface 120a having a rectangular ring shape formed around the oxygen-containing gas discharge passage 28b. The guide surface 120a extends from the inner wall surface side of the oxygen-containing gas discharge passage 28b in the horizontal direction, and then, the guide surface 120a is bent at substantially 90° in the direction of gravity.

The shape of the water guide member 120 is a substantially L-shape, which is the same as the water guide member 100 of the fifth embodiment. Therefore, in the seventh embodiment, the same advantages as in the cases of the fifth and sixth embodiments are obtained.

The second to seventh embodiments are applied to the fuel cell stack 10 according to the first embodiment. However, the present invention is not limited in this respect. The fuel cell stack 10 may be positioned inversely. For example, the end plate 20a having the inlet ports and the outlet port of the reactant gases and the coolant as shown in FIG. 1 may be provided at the lower end, and the end plate 20b may be provided at the upper end.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack formed by stacking a plurality of power generation cells in a direction of gravity, the power generation cells each including an electrolyte electrode assembly and a separator stacked together, the electrolyte electrode assembly including a pair of electrodes and an electrolyte interposed between the electrodes, a reactant gas flow field being formed for allowing a reactant gas to flow along a surface of the separator, a reactant gas supply passage and a reactant gas discharge passage being formed for allowing the reactant gas to flow in a stacking direction, wherein a water guide member is provided for at least the reactant gas discharge passage for allowing condensed water to be dropped directly in the direction of gravity along the reactant gas discharge passage, and wherein the water guide member is a plate member protruding into the reactant gas discharge passage.

2. A fuel cell stack according to claim 1, wherein the water guide member is inclined toward the direction of gravity.

3. A fuel cell stack according to claim 1, wherein the water guide member is bent toward the direction of gravity.

4. A fuel cell stack according to claim 1, wherein the water guide member has a ring-shape around the reactant gas discharge passage.

5. A fuel cell stack according to claim 1, wherein the water guide member is a resin member.

6. A fuel cell stack according to claim 2, wherein the water guide member is a triangular plate member.

7. A fuel cell stack according to claim 2, wherein the water guide member has a rectangular shape, and a plurality of flow grooves are formed in the water guide member.

8. A fuel cell stack according to claim 1, wherein the separator is a metal separator;
   a seal member is formed integrally with the metal separator; and
   the water guide member is made of the seal member.

9. A fuel cell stack according to claim 1, wherein the separator is a metal separator;
   the water guide member is formed integrally with the metal separator; and
   the water guide member is coated with an insulating material.

* * * * *